US012055283B1

(12) United States Patent
Zhang et al.

(10) Patent No.: US 12,055,283 B1
(45) Date of Patent: Aug. 6, 2024

(54) LAMP WITH REMOVABLE LENS

(71) Applicant: Signcomplex Limited, Shenzhen (CN)

(72) Inventors: Renxue Zhang, Guangxi (CN); Dongxian Zhang, Shenzhen (CN); Zhibin Li, Zixing (CN); Tiejun Wu, Shenzhen (CN)

( * ) Notice: Subject to any disclaimer, the term of this patent is extended or adjusted under 35 U.S.C. 154(b) by 0 days.

(21) Appl. No.: 18/419,832

(22) Filed: Jan. 23, 2024

(30) Foreign Application Priority Data

Nov. 20, 2023 (CN) ........................ 202311554161.0
Nov. 20, 2023 (CN) ........................ 202323136428.2

(51) Int. Cl.
*F21V 17/06* (2006.01)
*F21V 5/00* (2018.01)
*F21V 17/00* (2006.01)
*F21Y 105/16* (2016.01)

(52) U.S. Cl.
CPC .............. *F21V 17/06* (2013.01); *F21V 5/007* (2013.01); *F21V 17/005* (2013.01); *F21Y 2105/16* (2016.08)

(58) Field of Classification Search
CPC .......... F21V 7/06; F21V 5/007; F21V 17/005; F21V 7/16–18; F21Y 2105/16
See application file for complete search history.

(56) References Cited

U.S. PATENT DOCUMENTS

2012/0206917 A1* 8/2012 Burkard ................ F21V 17/164 362/396
2015/0241004 A1* 8/2015 Oberschmid ............. F21K 9/64 362/235
2016/0018088 A1* 1/2016 Guo ...................... F21V 17/164 362/455
2022/0003387 A1* 1/2022 Laukkanen ............. F21V 17/16
2023/0143772 A1* 5/2023 Hameau .................. F21V 17/12 362/311.03

* cited by examiner

*Primary Examiner* — Tracie Y Green
*Assistant Examiner* — Michael Chiang

(57) ABSTRACT

The present application provides a lamp with a removable lens, the lamp comprising: a lamp body provided with a mounting portion, a mounting groove being provided in the middle of the mounting portion; a lamp panel arranged on the mounting portion; a lens arranged on a top surface of the lamp panel, a connector being provided in the middle of the lens; a pressing frame, the pressing frame being pivotally arranged on the lamp body such that the pressing frame is capable of being flipped relative to the lamp body, the pressing frame being arranged around the mounting portion, and the pressing frame being in close fit with an upper edge of the lens so as to tightly press the lens on the lamp body; a snap-fit structure arranged between the lamp body and the pressing frame, the snap-fit structure fixing the lamp body and the pressing frame when the pressing frame closely fits with the upper edge of the lens; and a press-type latch structure arranged in the mounting groove, the press-type latch structure having a latched state in which the press-type latch structure snap fits with the connector, and an unlatched state in which the press-type latch structure releases the connector, and the press-type latch structure being switchable between the latched state and the unlatched state by means of pressing. This arrangement enables the lens to be removable and can further prevent the lens from deforming.

10 Claims, 2 Drawing Sheets

LAMP WITH REMOVABLE LENS

TECHNICAL FIELD

The present application relates to a lamp, and in particular to a lamp with a removable lens.

BACKGROUND

A lamp lens is an optical element, which changes parallel light rays emitted by a lamp into scattered light rays by changing a propagation mode and an angle of the light rays, thereby achieving light diffusion and focusing effects. Therefore, the quality of the lens directly affects the lighting effect of the lamp.

Currently, the lamp lenses on the market are generally secured on lamp bodies in the following two ways:

1. a bolting method, in which a lamp lens is secured to a lamp body by means of screws, and during mounting or dismounting, a tool is required to mount or dismount the lamp lens, such a mounting or dismounting operation is cumbersome, and the mounting or dismounting efficiency is low; and
2. a crimping method, in which a lamp body is provided with a pressing frame and a latch, the pressing frame is pivotally connected to the lamp body such that the pressing frame is capable of being flipped relative to the lamp body, a lamp lens is mounted on the lamp body and is pressed on the lamp body by the pressing frame, and the latch snap-fits with the pressing frame to fix the pressing frame on the lamp body; when this connection method is used, the middle of the lens is prone to deformation, which will affect the optical performance of the lamp lens; and in order to prevent the lamp lens from deforming, a reinforcing rib and a thickening pressing frame are typically added on the lens in the prior art, which increases manufacturing costs and it is still difficult to ensure no deformation of the lamp lens.

SUMMARY OF THE INVENTION

An embodiment of the present application provides a lamp with a removable lens, in order to solve the problems existing in related art. A technical solution is described as follows.

The embodiment of the present application provides a lamp with a removable lens, the lamp comprising:

- a lamp body provided with a mounting portion, a mounting groove being provided in the middle of the mounting portion;
- a lamp panel arranged on the mounting portion and exposing the mounting groove;
- a lens arranged on a top surface of the lamp panel, a connector being provided in the middle of the lens;
- a pressing frame, the pressing frame being pivotally arranged on the lamp body such that the pressing frame is capable of being flipped relative to the lamp body, the pressing frame being arranged around the mounting portion, and the pressing frame being in close fit with an upper edge of the lens so as to tightly press the lens on the lamp body;
- a snap-fit structure arranged between the lamp body and the pressing frame, the snap-fit structure fixing the lamp body and the pressing frame when the pressing frame closely fits with the upper edge of the lens; and
- a press-type latch structure arranged in the mounting groove, the press-type latch structure having a latched state in which the press-type latch structure snap fits with the connector, and an unlatched state in which the press-type latch structure releases the connector, and the press-type latch structure being switchable between the latched state and the unlatched state by means of pressing.

In an implementation, a bottom of the lens closely fits with the lamp panel when the press-type latch structure is in the latched state.

In an implementation, the lens is further provided with first positioning structures thereon, the lamp panel is provided with second positioning structures thereon, and the second positioning structures cooperate with the first positioning structures.

In an implementation, the number of the first positioning structures and the number of the second positioning structures are each two, the two first positioning structures are arranged on the lens at diagonal positions respectively, and each second positioning structure cooperates with a corresponding first positioning structure.

In an implementation, one of each of the first positioning structures and each of the second positioning structures is a positioning stud, and the other is a positioning hole.

In an implementation, the press-type latch structure comprises:

- a mounting seat provided with a positioning groove therein;
- a latch member movably inserted into the positioning groove, the latch member being provided with a latch portion, and the latch portion having a retracted state in which the latch portion is accommodated in the positioning groove, and an extended state in which the latch portion extends out of the positioning groove, wherein the latch portion, in the retracted state, snap-fits with the connector, and the latch portion, in the extended state, releases the connector; and
- an elastic member located between the latch member and a bottom wall of the positioning groove, the elastic member connecting the latch member and the mounting seat, and the elastic member being configured for providing an elastic force to the latch member when the latch portion is switched from the retracted state to the extended state.

In an implementation, the latch portion is provided with an accommodating region for accommodating an end portion of the connector in such a way that when the latch portion is in the retracted state, a top opening of the accommodating region becomes smaller so as to clamp the end portion of the connector, and when the latch portion is in the extended state, the top opening of the accommodating region becomes larger so as to release the end portion of the connector.

In an implementation, the latch portion is provided with at least two latching arms, the at least two latching arms being spaced apart from each other and enclosing the accommodating region.

In an implementation, a first limiting portion is provided at the end portion of the connector, and second limiting portions are provided on the latching arms, the second limiting portions abutting against the first limiting portion so as to restrict the end portion of the connector from exiting the accommodating region.

In an implementation, the mounting seat is provided with a first positioning portion, the latching arms are provided with second positioning portions, and when the latch portion is in the retracted state, the second positioning portions cooperate with the first positioning portion so as to restrict the latch portion from extending out of the positioning groove.

In an implementation, the snap-fit structure comprises a buckle and a snap-fit portion. The snap-fit portion is arranged on the pressing frame, one end of the buckle is pivotally arranged on the lamp body such that the buckle is capable of being turned up and down relative to the lamp body, and the other end of the buckle snap-fits with the snap-fit portion.

The above technical solution has at least the following advantages and beneficial effects.

Since the lamp of the present invention is provided with the connector in the middle of the lens and the press-type latch structure on the lamp body, during mounting, an edge of the lens can be tightly pressed by using the pressing frame, thus enabling the edge of the lens and parts near the edge to be in close fit with the lamp panel. Meanwhile, the middle of the lens can be held by means of snap-fitting of the connector and the press-type latch structure, so that the middle of the lens and parts near the middle can be in close fit with the lamp panel or tend to fit with the lamp panel, thereby eliminating or reducing the deformation of the lens, effectively preventing the lens from deforming, imparting the lens better optical performance, and thus improving the lighting effect of the lamp.

In addition, the pressing frame cooperates with the snap-fit structure to tightly press the edge of the lens on the lamp panel, and the middle of the lens is held to the lamp panel by using the connector and the press-type latch structure, both of which are in a removable manner. During mounting, the lens is placed on the lamp panel, the connector can snap-fit with the press-type latch structure by pressing the lens, and the pressing frame is then turned down to snap-fit with the snap-fit structure, thereby completing mounting. During dismounting, the snap-fit structure is disengaged, the pressing frame is then flipped, and finally the connector breaks away from the press-type latch structure by pressing the lens. This operation is simple, it is convenient and fast to mount or dismount, and the mounting or dismounting efficiency is high.

Moreover, since the connector snap-fits with the press-type latch structure, the lens can still be connected to the lamp body when the pressing frame is flipped, the lens can be prevented from falling off the lamp body in the process of flipping the pressing frame, and thus the effect of protecting the lens can be achieved.

The above summary is merely for the purpose of description, and is not intended to being limiting in any way. In addition to the above described aspects, implementations and features, further aspects, implementations and features of the present application will become readily apparent with reference to the accompanying drawings and the following detailed description.

BRIEF DESCRIPTION OF THE DRAWINGS

In accompanying drawings, unless otherwise specified, the same or similar components or elements are denoted by the same reference signs throughout a plurality of figures. These drawings are not necessarily drawn to scale. It should be understood that these drawings depict only some implementations according to the present application and should not be construed as limiting the scope of the present application.

LIST OF REFERENCE SIGNS

Figure 1:
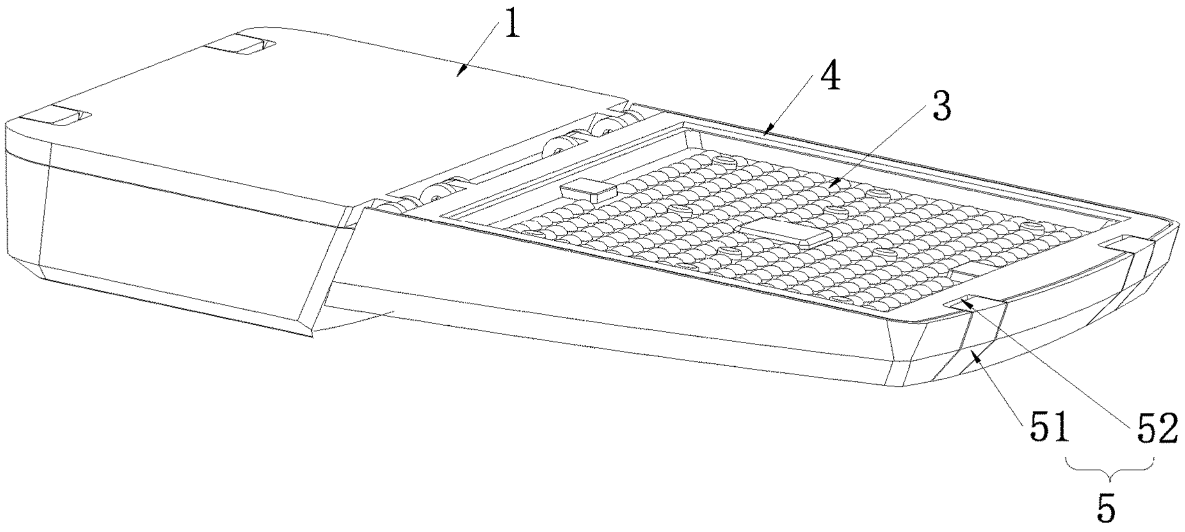
FIG. 1 is a schematic perspective structural diagram of a lamp of the present invention.

1—Lamp body; 11—Mounting portion; 12—Mounting groove; 2—Lamp panel; 21—Avoidance hole; 22—Second positioning structure; 3—Lens; 31—Connector; 311—First limiting portion; 32—First positioning structure; 4—Pressing frame; 5—Snap-fit structure; 51—Buckle; 52—Snap-fit portion; 6—Press-type latch structure; 61—Mounting seat; 611—Positioning groove; 62—Latch member; 621—Latch portion; 6211—Latching arm; 6212—Second limiting portion; 622—Accommodating region; 63—Elastic member; 7—Pressing plate; 8—Fastener.

DETAILED DESCRIPTION OF PREFERRED EMBODIMENTS

Only some exemplary embodiments are briefly described below. As can be appreciated by those skilled in the art, modifications may be made to the described embodiments in various ways without departing from the spirit or scope of the present application. Therefore, the accompanying drawings and the description are considered as exemplary in nature rather than limiting.

FIGS. 1-4 illustrate a lamp with a removable lens according to a preferred implementation of the present invention, the lamp comprising:

- a lamp body 1 provided with a mounting portion 11, a mounting groove 12 being provided in the middle of the mounting portion 11;
- a lamp panel 2 provided on the mounting portion 11 and exposing the mounting groove 12;
- a lens 3 arranged on a top surface of the lamp panel 2, a connector 31 being provided in the middle of the lens 3;
- a pressing frame 4 pivotally arranged on the lamp body 1 such that the pressing frame 4 is capable of being flipped relative to the lamp body 1, the pressing frame 4 being arranged around the mounting portion 11, and the pressing frame 4 being in close fit with an upper edge of the lens 3 so as to tightly press the lens 3 on the lamp body 1;
- a snap-fit structure 5 arranged between the lamp body 1 and the pressing frame 4, when the pressing frame 4 closely fits with the upper edge of the lens 3, the snap-fit structure 5 fixing the lamp body 1 and the pressing frame 4 and thus fixing the lens 3 to the lamp body 1; and a press-type latch structure 6 arranged in the mounting groove 12, the press-type latch structure 6 having a latched state in which the press-type latch structure 6 snap fits with the connector 31, and an unlatched state in which the press-type latch structure 6 releases the connector 31, and the press-type latch structure 6 being switchable between the latched state and the unlatched state by means of pressing.

Since the lamp of the present invention is provided with the connector 31 in the middle of the lens 3 and the press-type latch structure 6 on the lamp body 1, during mounting, an edge of the lens 3 can be tightly pressed by using the pressing frame 4, thus enabling the edge of the lens 3 and parts near the edge to be in close fit with the lamp panel 2. Meanwhile, the middle of the lens 3 can be held by means of snap-fitting of the connector 31 and the press-type latch structure 6, so that the middle of the lens 3 and parts near the middle can be in close fit with the lamp panel 2 or tend to fit with the lamp panel 2, thereby eliminating or reducing the deformation of the lens 3, effectively preventing the lens 3 from deforming, imparting the lens 3 better optical performance, and thus improving the lighting effect of the lamp.

In addition, the pressing frame 4 cooperates with the snap-fit structure 5 to tightly press the edge of the lens 3 on the lamp panel 2, and the middle of the lens 3 is held to the lamp panel 2 by using the connector 31 and the press-type latch structure 6, both of which are in a removable manner. During mounting, the lens 3 is placed on the lamp panel 2, the connector 31 can snap-fit with the press-type latch structure 6 by pressing the lens 3, and the pressing frame 4 is then turned down to snap-fit with the snap-fit structure 5, thereby completing mounting. During dismounting, the snap-fit structure 5 is disengaged, the pressing frame 4 is then flipped, and finally the connector 31 breaks away from the press-type latch structure 6 by pressing the lens 3. This operation is simple, it is convenient and fast to mount or dismount, and the mounting or dismounting efficiency is high.

Moreover, since the connector 31 snap-fits with the press-type latch structure 6, the lens 3 can still be connected to the lamp body 1 when the pressing frame 4 is flipped, the lens 3 can be prevented from falling off the lamp body 1 in the process of flipping the pressing frame 4, and thus the effect of protecting the lens 3 can be achieved.

In an implementation, when the press-type latch structure 6 is in the latched state, a bottom of the lens 3 is in close fit with the lamp panel 2 such that the lens 3 and the lamp panel 2 fit together, then reducing the deformation of the lens 3, and thus effectively preventing the lens 3 from deforming.

Referring to FIG. 1, in an implementation, the mounting portion 11 is of a groove structure, and the mounting portion 11 can accommodate at least the lamp panel 2, so as to position the lamp panel 2 and ensure that the lamp panel 2 is mounted at a set position.

Figure 2:
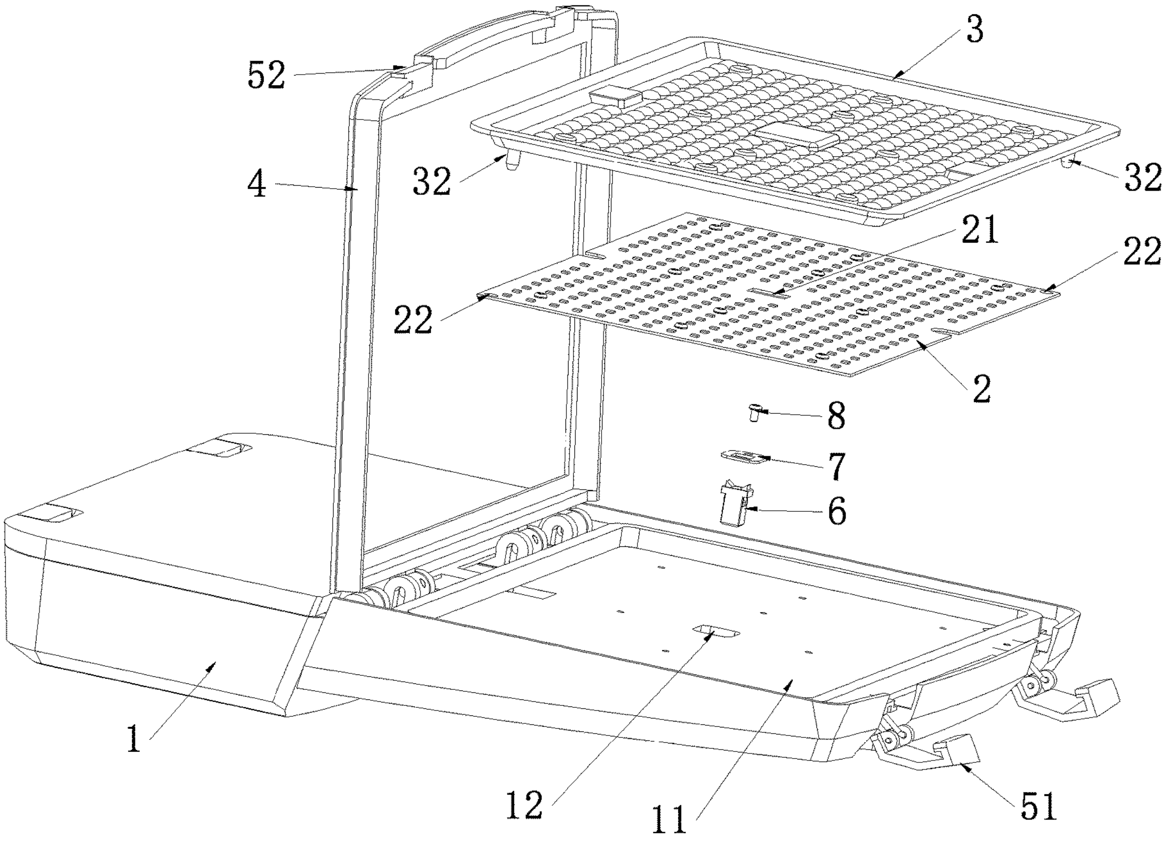
FIG. 2 is an exploded view of the lamp of the present invention.

Referring to FIG. 2, an avoidance hole 21 is provided in the middle of the lamp panel 2, the avoidance hole 21 vertically passes through the lamp panel 2, and the avoidance hole 21 is located above the mounting groove 12 and is in communication with the mounting groove 12. The avoidance hole 21 is used for an end portion of the connector 31 to pass through so as to avoid the end portion of the connector 31, and then the end portion of the connector 31 can cooperate with the press-type latch structure 6.

Referring to FIG. 2, in an implementation, the lens 3 is further provided with first positioning structures 32 thereon, the lamp panel 2 is provided with second positioning structures 22 thereon, and the second positioning structures 22 cooperate with the first positioning structures 32. In this way, the lens 3 can be mounted and guided by means of the cooperation between the first positioning structures 32 and the second positioning structures 22, such that the lens 3 can be mounted at the set position, ensuring that protrusions on the lens 3 are aligned to corresponding lamp beads on the lamp panel 2, preventing offset, thereby improving the lighting effect of the lamp. Meanwhile, the connector 31 and the press-type latch structure 6 can also be quickly aligned, and thus the mounting efficiency can be improved.

Referring to FIG. 2, in an implementation, the number of the first positioning structures 32 and the number of the second positioning structures 22 are each two, the two first positioning structures 32 are arranged on the lens 3 at diagonal positions respectively, and each second positioning structure 22 cooperates with a corresponding first positioning structure 32. In this way, a better positioning effect can be played on the lens 3, the problem can also be solved that the time for a mounting and positioning operation is too long due to the arrangement of the excessive number of the first positioning structures 32 and the excessive number of the second positioning structures 22, and thus the mounting efficiency of the lens 3 can be improved.

Of course, in other implementations, the number of the first positioning structures 32 and the number of the second positioning structures 22 may each be one, three or more, as long as these structures can play a mounting and positioning effect on the lens 3.

Referring to FIG. 2, in an implementation, one of each of the first positioning structures 32 and each of the second positioning structures 22 is a positioning stud, and the other is a positioning hole. By means of the cooperation between the positioning studs and the positioning holes, a mounting and guiding effect can be achieved, a certain limiting effect can also be played on the lens 3, and the lens 3 can be effectively prevented from being offset relative to the lamp panel 2 or the lens 3 can be effectively prevented from falling off the lamp panel 2.

Of course, in other implementations, one of each of the first positioning structures 32 and each of the second positioning structures 22 is a recess structure, the other is a protrusion structure, or both of the structures are protrusion structures.

Figure 4:
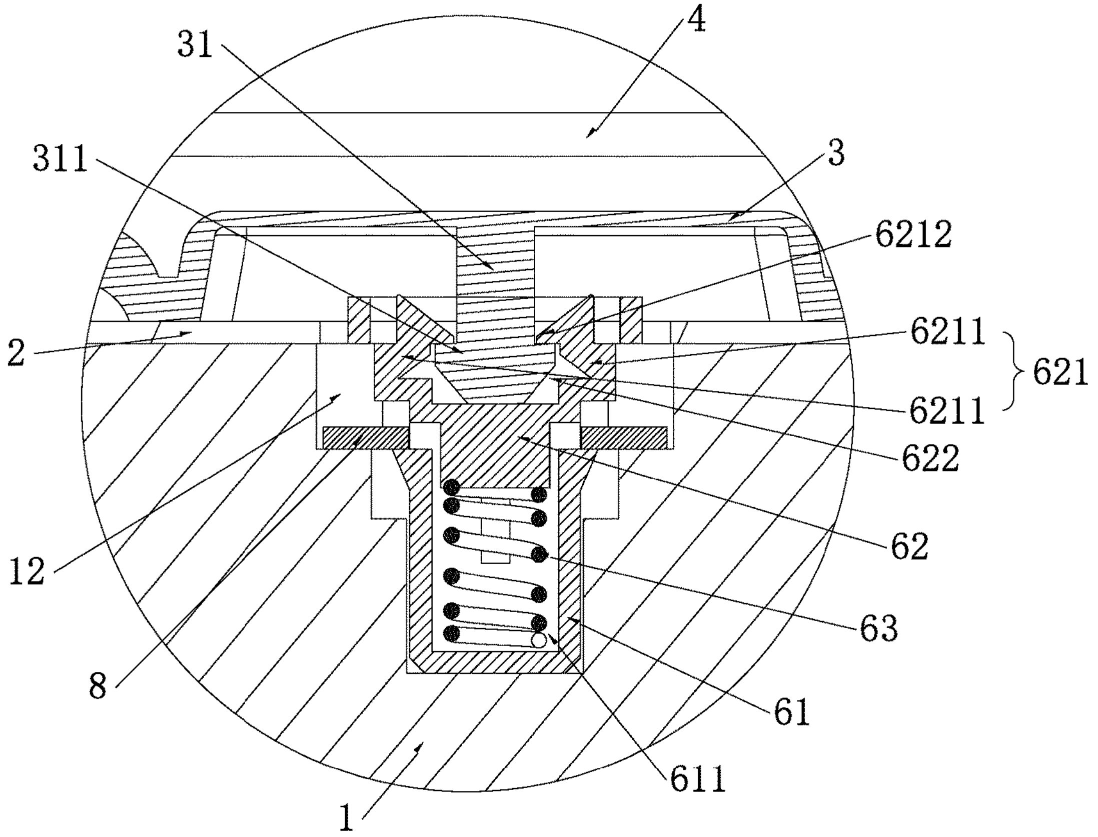
FIG. 4 is a partially enlarged view of part A in FIG. 3.

Referring to FIG. 4, in an implementation, the press-type latch structure 6 comprises:

- a mounting seat 61 provided with a positioning groove 611 therein;
- a latch member 62 movably inserted into the positioning groove 611, the latch member 62 being provided with a latch portion 621, and the latch portion 621 having a retracted state in which the latch portion is accommodated in the positioning groove 611 and an extended state in which the latch portion extends out of the positioning groove 611, where the latch portion 621, in the retracted state, snap-fits with the connector 31, and the latch portion 621, in the extended state, releases the connector 31; and
- an elastic member 63 located between the latch member 62 and a bottom wall of the positioning groove 611, the elastic member 63 connecting the latch member 62 and the mounting seat 61, and the elastic member 63 being configured for providing an elastic force to the latch member 62 when the latch portion 621 is switched from the retracted state to the extended state. That is, when the lens 3 is pressed, the lens 3 presses the connector 31, the connector 31 then presses the latch member 62, and the latch member 62 is pressed to move downward along the positioning groove 611; the latch member 62 moves downward to press the elastic member 63 such that the elastic member 63 accumulates a force, in this case, the latch member 62 is in the retracted state and the latch portion 621 snap-fits with the connector 31; when the lens 3 is pressed again, the lens 3 presses the connector 31, the connector 31 then presses the latch member 62, and the latch member 62 is pressed to move downward along the positioning groove 611 so as to be unlocked from the mounting seat 61; the elastic member 63 resets to push the latch member 62 to move upward along the positioning groove 611, the latch portion 621 then extends out of the positioning groove 611 to release the connector 31, unlocking the connector 31, so that the lens 3 can be removed from the lamp panel 2. This press-type latch structure 6 is simple and practical, convenient and fast to operate, high in reliability, small in size, and capable of avoiding occupying too much mounting space and making mounting more convenient.

Referring to FIG. 4, in an implementation, the latch portion 621 is provided with an accommodating region 622 for accommodating the end portion of the connector 31 in such a way that when the latch portion 621 is in the retracted state, a top opening of the accommodating region 622 becomes smaller so as to clamp the end portion of the connector 31 and then restrict the end portion of the connector 31 from exiting the accommodating region 622, and when the latch portion 621 is in the extended state, the top opening of the accommodating region 622 becomes larger so as to release the end portion of the connector 31, allowing the end portion of the connector 31 to exit the accommodating region 622. That is, the latch portion 621 is of a reducing structure. When the latch portion is in the retracted state, the inner diameter of the latch portion 621 becomes smaller, thus clamping the end portion of the connector 31; and when the latch portion is in the extended state, the latch portion 621 gets rid of the restriction of the positioning groove 611 to cause the inner diameter to become larger, and thus releasing the end portion of the connector 31.

Referring to FIG. 4, in an implementation, the latch portion 621 is provided with two latching arms 6211, the two latching arms 6211 being spaced apart from each other and enclosing the accommodating region 622. Since the two latching arms 6211 are spaced apart from each other and their own materials have a certain elasticity, when the latch portion 621 is in the retracted state, the latching arms 6211 can reliably clamp the end portion of the connector 31 under the restriction effect of the positioning groove 611, and when the latch portion 621 is in the extended state, the latching arms 6211 get rid of the restriction of the positioning groove 611, thereby releasing the end portion of the connector 31. The structure is simple and practical and high in reliability.

Of course, in other implementations, the number of the latching arms 6211 may be three or more.

Referring to FIG. 4, in an implementation, a first limiting portion 311 is provided at the end portion of the connector 31, and second limiting portions 6212 are provided on the latching arms 6211, the second limiting portions 6212 abutting against the first limiting portion 311, such that the latch portion 621 can reliably clamp the end portion of the connector 31, thereby restricting the end portion of the connector 31 from exiting the accommodating region 622. The structure is simple and practical and high in reliability.

In an implementation, the mounting seat 61 is provided with a first positioning portion (not shown in the figures), the latching arms 6211 are provided with second positioning portions (not shown in the figures), and when the latch portion 621 is in the retracted state, the second positioning portions cooperate with the first positioning portion to position the latch portion 621 and restrict the latch portion 621 from extending out of the positioning groove 611, thereby maintaining the latch portion 621 in the retracted state.

Referring to FIG. 4, in an implementation, the elastic member 63 is a spring. Of course, in other implementations, the elastic member 63 may also be an elastic structure such as an elastic sheet.

Figure 3:
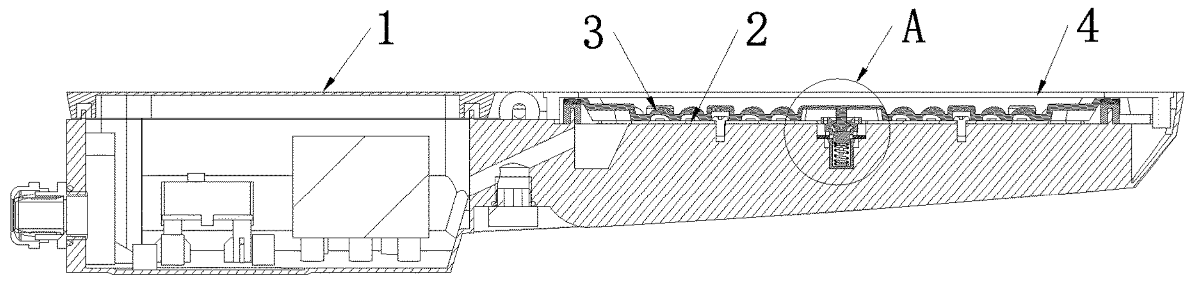
FIG. 3 is a cross-sectional view of the lamp of the present invention.

Referring to FIGS. 2 to 4, the press-type latch structure 6 further comprises a pressing plate 7 and a fastener 8. The pressing plate 7 abuts against the mounting seat 61, the pressing plate 7 is provided with a connecting hole, the connecting hole cooperates with the mounting seat 61, and the fastener 8 connects the pressing plate 7 and the lamp body 1 together to fix the mounting seat 61 on the lamp body 1.

Of course, in other implementations, the above-mentioned press-type latch structure 6 may specifically be of a similar press-type structure applied to a ballpoint pen to control extension or retraction of a ballpoint pen refill.

Referring to FIGS. 1 and 2, the snap-fit structure 5 comprises a buckle 51 and a snap-fit portion 52. The snap-fit portion 52 is arranged on the pressing frame 4, one end of the buckle 51 is pivotally arranged on the lamp body 1 such that the buckle 51 is capable of being turned up and down relative to the lamp body 1, and the other end of the buckle 51 can then engage with or disengage from the snap-fit portion 52. This snap-fit structure 5 has high snap-fit reliability and can ensure that the pressing frame 4 can reliably press the lens 3.

Of course, in other implementations, the snap-fit structure 5 may comprise a male buckle and a female buckle. The male buckle is provided on the lamp body 1, and the female buckle is provided on the pressing frame 4, so that reliable snap-fitting between the pressing frame 4 and the lamp body 1 can similarly be achieved.

In the description of this specification, descriptions with reference to the terms such as "an embodiment", "some embodiments", "example", "specific example", or "some examples" mean that specific features, structures, materials, or characteristics described with reference to the embodiment or example are included in at least one embodiment or example of the present application. Moreover, the specific features, structures, materials or characteristics described can be combined in any one or more embodiments or examples in any suitable manner. In addition, without any contradiction, a person skilled in the art may bind and combine different embodiments or examples and features of the different embodiments or examples in the description.

In addition, the terms "first" and "second" are used for descriptive purposes only, and cannot be construed as indicating or implying relative importance or implicitly indicating the number of technical features indicated. Thus, the features defined with "first" and "second" may explicitly or implicitly include at least one of the features. In the description of the present application, the meaning of "a plurality of" is two or more, unless explicitly and specifically defined otherwise.

The above description is merely specific implementations of the present application, but is not intended to limit the scope of protection of the present application. Any variation or replacement readily figured out by a person skilled in the art within the technical scope disclosed in the present application shall fall within the scope of protection of the present application. Therefore, the scope of protection of the present application shall be subject to the scope of protection of the claims.

What is claimed is:

1. A lamp with a removable lens, the lamp comprising:

a lamp body provided with a mounting portion, a mounting groove being provided in the middle of the mounting portion;

a lamp panel arranged on the mounting portion and exposing the mounting groove;

a lens arranged on a top surface of the lamp panel, a connector being provided in the middle of the lens;

a pressing frame, the pressing frame being pivotally arranged on the lamp body such that the pressing frame is capable of being flipped relative to the lamp body, the pressing frame being arranged around the mounting portion, and the pressing frame being in close fit with an upper edge of the lens so as to tightly press the lens on the lamp body;

a snap-fit structure arranged between the lamp body and the pressing frame, the snap-fit structure fixing the lamp body and the pressing frame when the pressing frame closely fits with the upper edge of the lens; and a press-type latch structure arranged in the mounting groove, the press-type latch structure having a latched state in which the press-type latch structure snap fits with the connector, and an unlatched state in which the press-type latch structure releases the connector, and the press-type latch structure being switchable between the latched state and the unlatched state by means of pressing.

2. The lamp with a removable lens according to claim 1, wherein a bottom of the lens closely fits with the lamp panel when the press-type latch structure is in the latched state.

3. The lamp with a removable lens according to claim 1, wherein the lens is further provided with first positioning structures thereon, the lamp panel is provided with second positioning structures thereon, and the second positioning structures cooperate with the first positioning structures.

4. The lamp with a removable lens according to claim 3, wherein the number of the first positioning structures and the number of the second positioning structures are each two, the two first positioning structures are arranged on the lens at diagonal positions respectively, and each second positioning structure cooperates with a corresponding first positioning structure.

5. The lamp with a removable lens according to claim 3, wherein one of each of the first positioning structures and each of the second positioning structures is a positioning stud, and the other is a positioning hole.

6. The lamp with a removable lens according to claim 1, wherein the press-type latch structure comprises:

a mounting seat provided with a positioning groove therein;

a latch member movably inserted into the positioning groove, the latch member being provided with a latch portion, and the latch portion having a retracted state in which the latch portion is accommodated in the positioning groove, and an extended state in which the latch portion extends out of the positioning groove, wherein the latch portion, in the retracted state, snap-fits with the connector, and the latch portion, in the extended state, releases the connector; and an elastic member located between the latch member and a bottom wall of the positioning groove, the elastic member connecting the latch member and the mounting seat, and the elastic member being configured for providing an elastic force to the latch member when the latch portion is switched from the retracted state to the extended state.

7. The lamp with a removable lens according to claim 6, wherein the latch portion is provided with an accommodating region for accommodating an end portion of the connector in such a way that when the latch portion is in the retracted state, a top opening of the accommodating region becomes smaller so as to clamp the end portion of the connector, and when the latch portion is in the extended state, the top opening of the accommodating region becomes larger so as to release the end portion of the connector.

8. The lamp with a removable lens according to claim 7, wherein the latch portion is provided with at least two latching arms, the at least two latching arms being spaced apart from each other and enclosing the accommodating region.

9. The lamp with a removable lens according to claim 8, wherein a first limiting portion is provided at the end portion of the connector, and second limiting portions are provided on the latching arms, the second limiting portions abutting against the first limiting portion so as to restrict the end portion of the connector from exiting the accommodating region.

10. The lamp with a removable lens according to claim 1, wherein the snap-fit structure comprises a buckle and a snap-fit portion, the snap-fit portion being arranged on the pressing frame, one end of the buckle being pivotally arranged on the lamp body such that the buckle is capable of being turned up and down relative to the lamp body, and the other end of the buckle snap-fits with the snap-fit portion.

* * * * *